United States Patent [19]
Zguris et al.

[11] Patent Number: 6,143,441
[45] Date of Patent: Nov. 7, 2000

[54] FILLED GLASS FIBER SEPARATORS FOR BATTERIES AND METHOD FOR MAKING SUCH SEPARATORS

[75] Inventors: George C. Zguris, Canterbury, N.H.; Frank C. Harmon, Jr., Ayer, Mass.

[73] Assignee: Hollingsworth & Vose Company, East Walpole, Mass.

[21] Appl. No.: 09/043,607

[22] PCT Filed: Sep. 18, 1996

[86] PCT No.: PCT/US96/14966

§ 371 Date: Mar. 19, 1998

§ 102(e) Date: Mar. 19, 1998

[87] PCT Pub. No.: WO97/11501

PCT Pub. Date: Mar. 27, 1997

Related U.S. Application Data

[60] Provisional application No. 60/004,008, Sep. 20, 1995.

[51] Int. Cl.[7] .................................................... H01M 4/14
[52] U.S. Cl. ............................................. 429/144; 429/225
[58] Field of Search ...................................... 429/225, 144

[56] References Cited

U.S. PATENT DOCUMENTS

| | | | |
|---|---|---|---|
| 4,137,377 | 1/1979 | McClelland | 429/145 |
| 4,262,068 | 4/1981 | Kono et al. | 429/204 |
| 4,414,295 | 11/1983 | Uba | 429/59 |
| 5,225,298 | 7/1993 | Nakayama et al. | 429/252 |
| 5,468,572 | 11/1995 | Zguris et al. | 429/247 |

*Primary Examiner*—Maria Nuzzolillo
*Assistant Examiner*—M. Wills
*Attorney, Agent, or Firm*—John C. Purdue; David C. Purdue

[57] ABSTRACT

A multi-layer sheet useful as a separator (10) in a lead acid battery is disclosed. The sheet comprises at least a first layer (12) and a second layer (14) and having been produced by the method consisting of the steps of forming the first layer (12) by depositing a first, substantially binder free furnish consisting essentially of glass fibers onto the wire (36) of a paper making machine (30) and forming the second layer (14) by depositing a second, substantially binder free furnish consisting essentially of glass fibers and silica powder or another suitable silicate powder onto the first layer (12) on the wire (36) of the paper making machine (30). The silica or silicate powder has a particle size and being present in the second layer (14) in an amount such that, if the second substantially binder free furnish was deposited directly on the wire (36) of the paper making machine (30) a significant portion of the silica or silicate powder would pass through the wire (36).

16 Claims, 2 Drawing Sheets ic # FILLED GLASS FIBER SEPARATORS FOR BATTERIES AND METHOD FOR MAKING SUCH SEPARATORS

This application claims benefit of Provisional application 60/004,008, filed Sep. 20, 1995.

BACKGROUND OF THE INVENTION

1. Field of the Invention

The present invention relates generally to the field of batteries and, more specifically, to separators containing glass fibers which are positioned between the positive and negative plates of batteries and to a method for producing such separators.

DEFINITIONS

Subsequently herein, the term "percent v/v" means percent by volume; the term "percent w/w" and the symbol % mean percent by weight; the term "wire", as applied to a paper making machine, means the surface of the machine on which a furnish is cast in producing paper, and can be, for example, the screen of a Fourdrinier machine or the vacuum drum of a rotoformer machine; all temperatures are in ° C.; and the following abbreviations have the meanings indicated: psi means pounds per square inch, $\mu$m=micron or microns; mg=milligram or milligrams; g=gram or grams; kg=kilogram or kilograms; l=liter or liters; ml=milliliter or milliliters; cc=cubic centimeter or cubic centimeters; pcf= pound per cubic foot or pounds per cubic foot; m=meter or meters; cm=centimeter or centimeters; KPa=pressure in thousands of Newtons per square meter; and KN=force in thousands of Newtons.

2. Description of the Prior Art

Valve regulated ("sealed"—"recombinant") lead acid (VRLA) batteries are known; they usually comprise a plurality of positive and negative plates, as in a prismatic cell, or layers of separator and positive and negative electrodes wound together, as in a "jelly roll" cell. The plates are arranged so that they alternate, negative—positive— negative, etc., with separator material separating each plate from adjacent plates. The separator, typically composed of a mat of glass fibers, is an inert material; it stores battery acid without stratification, and provides low electric resistance. In addition, in VRLA batteries, the separator material provides innumerable gas channels between the plates through which oxygen can migrate from the positive electrode, when generated there, to the negative electrode where it can be recombined with hydrogen, according to the oxygen cycle. Another important function of a separator is to exert pressure between the plates, ensuring that there is an interface, along the faces of the plates, among the plate paste or active material, the electrolyte and oxygen.

Glass fiber separator material is produced commercially on paper making equipment including fourdrinier machines and rotoformers, inclined fourdrinier machines and extended wire rotoformers. In the production of separator made of glass fibers for VRLA batteries, it is preferred that no organic binder be added to a furnish from which separator sheets are made; the entanglement of individual fibers serves to maintain the sheet in a cohesive structure, and water glass, which sometimes forms on the fiber surfaces, serves as a binder. Organic binders, however, tend to decrease the ability of a separator to wick acid, and to decrease the amount of acid a separator can hold. A great deal of work has been directed to modifying the glass fiber furnish from which separators are produced to improve battery performance and/or lower the cost of the separator. Some of the work has entailed the addition of synthetic fibers for various reasons, such as the use of thermoformable plastic fibers so that the separator can be heat sealed on its edges to envelop a plate. Other work, which pertains to the field of this invention, has been directed to the use of filler, e.g., silica, to provide separators which are comparable to all glass fiber separators, at a lower cost. Prior art patents are discussed below.

U.S. Pat. No. 4,465,748 (Harris) discloses glass fiber sheet material for use as a separator in an electrochemical cell, and made from 5 to 35 percent w/w of glass fibers less than 1 $\mu$m in diameter; the patent also discloses a glass fiber sheet for such use wherein there are fibers of a continuous range of fiber diameters and lengths, and most of the fibers are not over 5 mm in length.

U.S. Pat. No. 4,216,280, (Kono et al.), discloses glass fiber sheet material for use as a plate separator in a battery, and made from 50 to 95 percent w/w of glass fibers less than 1 $\mu$m in diameter and 50 to 5 percent w/w of coarser glass fibers. The coarser glass fibers, the reference says, have a fiber diameter larger than 5 $\mu$m, preferably larger than 10 $\mu$m, and it is advantageous for some of the coarser fibers to have diameters of 10 $\mu$m to 30 $\mu$m.

U.S. Pat. No. 4,205,122 (Minra et al) discloses a battery separator of reduced electric resistance comprising a self supporting, non woven mat consisting essentially of a mixture of olefinic resin fibers having a coarseness of from 4 to 13 decigrex and olefinic resin fibers having a coarseness of less than 4 decigrex, the latter fibers being present in an amount of not less than 3 parts by weight per 100 parts by weight of fibers; up to about 600 parts by weight of inert filler materials per 100 parts by of fibers can also be used. The battery separator is produced by subjecting a suitable aqueous dispersion to a sheet-forming operation, drying the resulting wet, non-woven mat, and heat treating the dried mat at a temperature ranging from a point 20° lower than the melting point of the aforementioned fibers to a point about 50° higher than the melting point.

U.S. Pat. No. 4,387,144 (McCallum) discloses a battery separator having a low electrical resistance after extended use which is made by thermal consolidation and thermal embossing of a paper web formed from a furnish containing a synthetic pulp the fibrils of which are filled with an inorganic filler, the web incorporating a wetting agent which is preferably an organic sulphonate, and organic succinate, or phenol ethoxylate.

U.S. Pat. No. 4,373,015 (Peters et al.), discloses sheet material for use as a separator in a battery, and "comprising organic polymeric fibers"; both of the examples of the reference describe the sheet material as "short staple fiber polyester matting about 0.3 mm thick", and indicate that the polyester fibers range from about 1 $\mu$m to about 6 $\mu$m in diameter.

Sheet separators for use in conventional (not valve regulated) batteries and comprising both glass fibers and organic fibers are disclosed in all of the following U.S. Pats.: No. 4,529,677 (Bodendorf); No. 4,363,856 (Waterhouse); and No. 4,359,511 (Strzempko).

U.S. Pat. No. 4,367,271, Hasegawa, discloses storage battery separators composed of acrylic fibrils in an amount of up to about 10 percent by weight, balance glass fibers.

Japanese patent document 55/146,872 discloses a separator material comprising glass fibers (50–85 percent w/w) and organic fibers (50–15 percent w/w).

U.S. Pat. No. 4,245,013, Clegg et al., discloses a separator made by overlaying a first sheet of fibrous material including polyethylene fibers with a second sheet of fibrous material including polyethylene and having a synthetic pulp content higher than the first sheet.

U.S. Pat. No. 4,908,282, Badger, discloses a separator comprising a sheet made from first fibers which impart to the sheet an absorbency greater than 90% and second fibers which impart to the sheet an absorbency less than 80% wherein the first and second fibers are present in such proportions that the sheet has an absorbency of from 75 to 95%. This patent discloses that when this separator is saturated with electrolyte, unfilled voids remain so that gas can transfer from plate to plate for recombination.

U.S. Pat. No. 5,091,275 (Brecht et al.) discloses a glass fiber separator which expands when exposed to electrolyte. The separator comprises glass fibers which are impregnated with an aqueous solution of colloidal silica particles and a sulfate salt. The separator is produced by forming a paper making web of glass fibers, impregnating the web with the aqueous mixture of silica and the salt, lightly compressing the impregnated web to remove some of the aqueous solution, partially drying the web, compressing the web to a final thickness and completing the drying of the web. The web is preferably compressed to a thickness which is less than the distance between plates in a given cell, so that insertion of an assembled cell stack into a case is facilitated. When electrolyte is added to the case, the salt dissolves in the electrolyte and the separator expands to provide good contact between the plates and the separators. According to the patent, the silica contributes to the recombination performance of cells incorporating the pre-compressed separator. The silica also contributes a great deal of stiffness to the separator, so much so that the separator may be characterized as rigid.

It has been determined that the production of battery separator by paper-making techniques from a furnish of glass fibers and silica powder leads to problems which are caused by variations in the concentration of the silica powder in the furnish. Typical glass fiber furnishes have a liquid content exceeding 98 percent w/w. In the course of making separator sheets, most of the water is removed from the furnish in the first few feet of a screen on which the furnish is cast. The water, known as white water, is recycled and winds up back in the headbox of the machine. If the furnish is composed exclusively of glass fibers, virtually none of the fibers pass through the wire and wind up in the white water. However, furnishes comprising glass fibers and silica powder do not fare so well. In the absence of a binder, significant amounts of silica powder from such furnishes do pass through the paper making wire and wind up in the white water. Left unchecked, this phenomenon causes the concentration of silica powder in the furnish to increase, undesirably changing the properties of the furnish. Heretofore, the problem of silica powder and the like passing through a paper making wire has been avoided through the use of binders. Patents disclosing the production of glass fiber separator including a powdered filler and a binder are discussed below.

U.S. Pat. No. 2,653,985 (Philipps I) discloses a separator comprising a glass fiber mat, preferably formed in accordance with the disclosure of U.S. Pat. No. 2,306,347 (Slayter) with a surface layer formed of particulate materials such as silica or silicates, stating that diatomaceous earth is a highly preferred form of silica, and that over 10,000 varieties of diatoms are known. Binder, in particulate form, is mixed with the surface layer particles and this mixture, in the form of a slurry or aqueous suspension, can be formed into a layer by impregnating a glass fiber mat with the slurry or suspension, and heating to dry the mat. This layer is then bonded to a more substantial mat comprising glass fibers to form a composite separator material. U.S. Pat. No. 2,653,986 (Philipps II) discloses preferred elastomeric binder particles for use in forming the composite separator disclosed in Philipps I.

U.S. Pat. No. 3,085,126 (Labino) discloses a composite glass fiber article for use as a battery separator material. The article is a flexible, glass fiber mat having a multiplicity of fine pores and comprises about 65 to about 87 percent w/w of glass fibers having a diameter of about 2 to 3 $\mu$m and a length of about 0.6 inch to about 1 inch, about 5 to 15 percent w/w of glass fibers having a diameter of about 0.25 to 0.5 $\mu$m and a length not greater than $\frac{1}{16}$ of an inch, about 5 to 10 percent w/w of at least one non film forming binder selected from the group consisting of colloidal silica and colloidal alumina and about 3 to 20 percent w/w of a thermoplastic binder.

U.S. Pat. No. 3,022,366 (Kilroy) discloses a glass fiber separator including a microporous layer preferably formed by depositing a slurry containing a binder and finely divided inorganic particles which are inert to battery reactions and materials present in the battery on a glass fiber mat base which also includes a binder. This patent says the particles can be of diatomaceous earth, silica, pulverized glass, kieselguhr, clay, wollastonite, pumice and other natural and synthetic silicates, warning that the particles should be free of impurities such as iron, aluminum, zirconium and their oxides and other materials which will react with battery acids and reduce the capacity of the battery. The glass fiber mat base is formed from stretched glass fibers that have been formed and wound onto a drum. The diameter of these fibers is in the range of 200 to 400 $\mu$m.

U.S. Pat. No. 4,216,281 and No. 4,265,985 (O'Rell et al. I and II) disclose a separator comprising 30–70 percent w/w of a fibrous polyolefin synthetic pulp, 15–65 percent w/w of a particulate siliceous filler (particle size 0.01–20 $\mu$m), and about 1–35 percent w/w long paper making staple fibers, including glass fibers. These patents speak directly to the use of a retention aid for improving the retention of the siliceous filler in the fibrous web and, preferably, a two-component retention aid.

U.S. Pat. No. 4,529,677 (Bodendorf) discloses a battery separator which is acid wettable but not water wettable and which comprises from about 5 to about 20 percent w/w of polyolefin fiber, from about 2 to about 15 percent w/w of polyester fiber, from 0 to about 20 percent w/w of glass fiber, from about 40 to about 75 percent w/w of diatomaceous earth and from about 7 to about 20 percent w/w of an acrylate copolymer binder which includes a silane coupling agent attached to the polymeric backbone, said separator being characterized by a total pore volume of about 70 percent or higher with an average pore size between about 5 to about 30 $\mu$m and an ohmic resistance of about 0.015 ohm per inch$^2$ or less.

U.S. Pat. No. 3,753,784 (Eisenacher) discloses a multi layer separator material for lead acid batteries. The separator has at least three layers: two outer layers composed of glass fiber sheets and an inner layer, sandwiched between the glass fiber sheets, and comprising latex bound silica, diatomaceous earth or the like.

U.S. Pat. No. 5,225,298 (Nakayama et al.) discloses a sealed lead acid battery and a separator for use in such a battery. The separator may comprise glass fibers of fine diameter, alone, or a combination of glass fibers and silica powder, preferably silica powder made by a wet process.

According to the patent, separator comprising silica powder and glass fiber separator is made by a conventional sheet making process where glass fibers and silica powder are dispersed in acidified water at a pH of, preferably, 2.5. The patent indicates that a polymeric coagulant such as polyacryl amide or the like may be used "if necessary, for enhancing the fixing of the powder to improve the yield" (column 8, lines 14 and 15) and states that "a water-glass like material is formed on the surfaces of the fibers" when alkali silicate-containing fibers are used. The patent states that silica powder may be present in the separator in the range of 5 to 70 percent w/w, balance glass fibers, but specifically discloses the production of separator material, with or without silica powder, only from alkali silicate containing glass fibers.

SUMMARY OF THE INVENTION

The instant invention is based upon the discovery that silica powder can be incorporated in glass fiber separator which does not include a binder and that such a separator can be produced on paper-making equipment without causing the above-mentioned silica powder concentration problems.

The separator consists essentially of glass fibers and powdered silica or another powdered material that is inert to battery reactions and materials that are present in a battery. The separator is made, in accordance with the method of this invention, by dispensing a glass fiber furnish from a first head box onto the wire or screen of a paper making machine to produce a first, thin layer of glass fiber mat, preferably having a grammage in the vicinity of 20 to 50 g/m$^2$ and, most desirably, 30 to 40 g/m$^2$, by dispensing a glass fiber and silica or another inert powder furnish from a second head box onto the first, thin layer of glass fiber mat, as a second layer having a grammage in the vicinity of 150 to 300 g/m$^2$ and, preferably, 200 to 250 g/m$^2$, to produce a dual layer, glass fiber and inert powder separator which is free of organic binders and has a grammage of about 200 to 300 g/m$^2$. The method is carried out under conditions, described in full detail below, so that the inert powder from the second headbox is substantially fully entrapped in the dual layer separator and does not, therefore, pass through the wire of the paper making machine.

Accordingly, it is an object of the present invention to incorporate silica or another inert powder in a glass fiber separator without the use of a binder.

It is a further object of the invention to produce such a separator on conventional paper making equipment, such as a fourdrinier machine or a rotoformer, without the problems associated with silica or another powder passing through the paper making wire or screen.

It is yet another object to provide separator which is ideally suited for use in VRLA batteries.

These and other objects and advantages of the present invention will become apparent to those skilled in the art from the following detailed description of the preferred embodiments, reference being made to the various drawing figures.

DETAILED DESCRIPTION OF THE PREFERRED EMBODIMENTS

Figure 2:
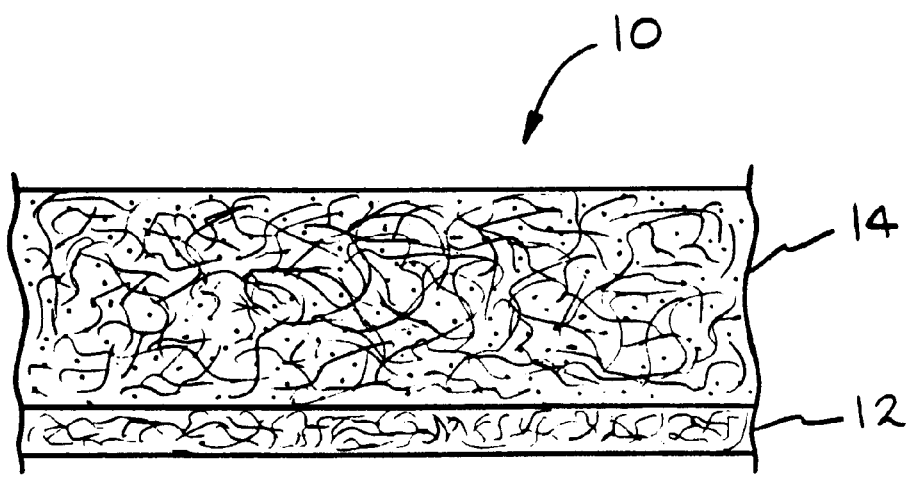
FIG. 2 is a view in vertical section showing separator material according to the present invention.

The present invention, in a specific embodiment, is a binder-free, filled glass fiber separator which is indicated generally at 10 in FIG. 2, and a method for producing the separator. The separator comprises a first layer 12 comprising, essentially, glass fibers and a second layer 14 comprising, essentially, a mixture of glass fibers and silica powder. The first layer 12 is thinner than the second layer 14. Preferably, the first layer 12 has a grammage of 20 to 50 g/m$^2$, i.e., a sheet which is one meter square has a weight of between 20 and 50 g. Most desirably, the first layer 12 has a grammage of 30 to 40 g/m$^2$. When the thickness of the first layer 12 is one which results when the grammage is within the specified ranges, it is possible to maximize the amount of silica filler in the separator 10. A first layer 12 having a grammage as low as 20 to 30 g/m$^2$ has been found to be thick enough to prevent silica powder from the second layer 14 from passing through the paper making wire of a paper making machine. It is within the scope of the present invention, however, to provide a first layer 12 which has a grammage in excess of 50 g/m$^2$.

Figure 1:
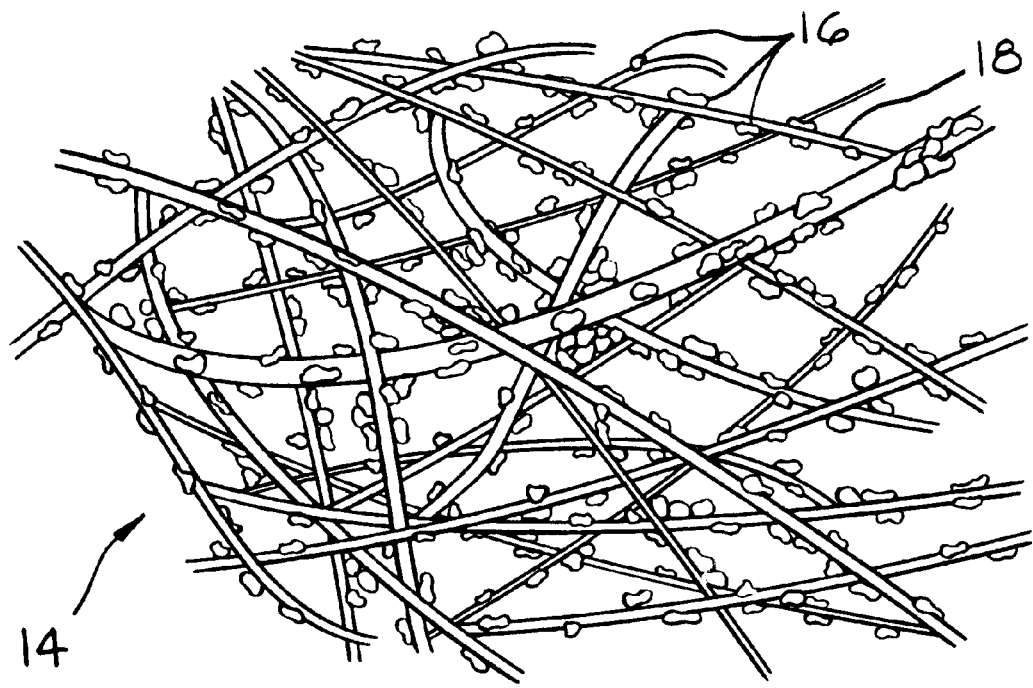
FIG. 1 is a drawing showing, greatly enlarged, the filled portion of a separator of the instant invention.

The second layer 14, as shown in more detail in FIG. 1, comprises a mixture of silica particles 16 and glass fibers 18. In a preferred embodiment of the invention, the silica particles 16 are inorganically bonded to the glass fibers 18 by water glass (not shown). This is achieved, in a manner described in more detail below, by controlling the composition and acidity of the furnishes that are used to make the layers 12 and 14 of the separator 10.

The first layer 12 and the second layer 14 consist essentially of glass fibers and of glass fibers and silica powder, respectively. These layers do not include organic binders or retention aids in amounts which could affect the performance of a battery in which the separator 10 is used. These layers may include organic fibers, especially those that are known to be suitable for use in producing separator material. Examples of such fibers include polyester, polyethylene, polypropylene, other polyolefin, acrylic and the like fibers, including bi-component fibers, both side by side and sheath core. Suitable sheath core fibers are available from Kurary, a Japanese Company, under the trade designation SOFIT N 720. The bi-component fibers, when used, serve the purpose of making the separator material stronger because a low melting component softens when the separator is dried, and of making it capable of thermal welding because a higher melting component is softened at the temperatures employed in welding. The one-component fibers can be used to limit the capability of the separator to retain electrolyte when the material is in use in a battery, so that the completed battery can be flooded with electrolyte and formed, and excess electrolyte can then be poured from the battery; the separator retains only enough electrolyte that the battery is recombinant.

Figure 3:
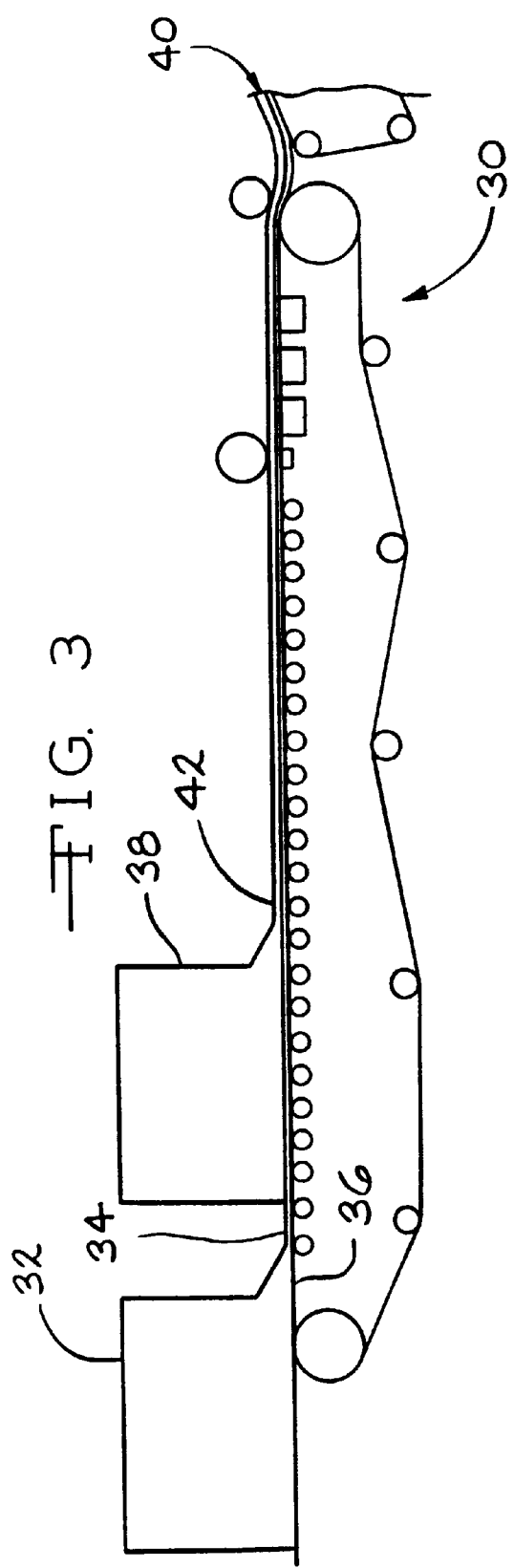
FIG. 3 is a schematic representation of a fourdrinier paper making machine, including a second headbox for use in producing separator according to the present invention.

Separator according to the present invention is preferably made on a paper making machine such as a fourdrinier machine, a portion of which is indicated generally at 30 in FIG. 3. The machine 30 comprises a first headbox 32 for depositing a first furnish to produce a first web 34 on a paper making wire 36 which rotates in a clock-wise direction, advancing the first web 34 from left to right in FIG. 3. The furnish has an extremely low solids content and is composed, primarily, of acidified water. Most of the liquid in the furnish flows through the paper making wire 36, in the first few feet. Virtually all of the glass fibers in the furnish are caught on the paper making wire 36.

A second headbox 38 is positioned to deposit a second furnish on the web 34 to produce a dual layered web 40 comprising the first web 34 and a second web 42 on top of the first web 34. The dual layered web 40 advances from left to right on the paper making wire and leaves the wire containing only a small fraction of the liquid that was in the furnishes deposited onto the wire from the first and second headboxes 32 and 38. Downstream from the portion of the machine 30 which is illustrated, the dual layer web 40 passes through drying stations, typically including huge cans (not shown) which are heated well above 100°. The web is dried and wound into rolls, before or after being slit to a size suitable for use as a battery separator.

Liquid that is removed from the furnishes flows through the paper making wire 36 and is collected in a wire pit (not shown) from which it is recycled back through the system. The liquid, commonly known as white water, is acidified and is used over and over again in the process of making separator. In prior art methods for making filled separator from a furnish containing small particles of silica or other inert powder, the use of a retention aid to fix the particles in the fibrous web was necessary to prevent variations in the concentration of the powder in the furnish caused by the passage of the powder through the paper making screen. In the production of separator according to the present invention, the need for a retention aid and the potential for decreased performance attributable to the presence or the character of the retention aid are completely eliminated.

EXAMPLE 1

Dual layered, filled glass fiber separator hand sheets were produced in a laboratory apparatus by sequentially depositing first and second furnishes on a wire or screen, and draining the furnishes. The apparatus comprised a tank with a screen in the bottom, a drain below the screen, a valve which opened and closed the drain, and paddles which were moved back and forth to simulate the movement of a furnish in commercial papermaking apparatus and establish a "machine direction" parallel to the direction of paddle movement. The first furnish comprised acidified water, pH 2.7, and solids composed of 70 percent w/w Schuller 206 glass fibers, average fiber diameter of 0.76 $\mu$m, and 30 percent w/w Schuller 210X glass fibers, average fiber diameter of 3.0 $\mu$m. The first furnish was poured into the apparatus and drained through the screen to produce a first layer on the screen with a grammage of about 50 g/m². The first layer remained on the screen of the laboratory apparatus and the second furnish was deposited onto the first layer. The second furnish was composed of acidified water, pH 2.5, and solids made up of 70 percent w/w amorphous silica, and 30 percent w/w Schuller 206 glass fibers. The second furnish was drained, through the first layer and the screen, to produce a second layer, on top of the first layer, having a grammage of about 250 g/m². The dual layered separator hand sheets were heated in a drying oven to about 150° for 30 minutes, and were then tested and various data, summarized below, were collected.

Grammage: 309.25 g/m²
Thickness (under a load of 10.34 KPa): 1.75 mm
Tensile (KPa total): 0.37
Elongation (percent of total): 1.3
Maximum Pore (mn; first bubble): 23
Surface area (m²/g): 1.5
Wicking, Water (seconds/10 mm): 118
Percent (v/v) voids 84

"Wicking", as reported above and subsequently herein, was determined by the procedure described in U.S. Pat. No. 5,225,298, column 7, lines 20 and following, using water instead of sulfuric acid as there described.

The Schuller 206 and 210 glass fibers used in Example 1 and in subsequent Examples have the same nominal compositions, but vary slightly from time to time. Mean values, in percent by weight, calculated from data furnished by Schuller for the period when the examples were carried out are given below:

| | |
|---|---|
| $SiO_2$ | 65.40 |
| $Al_2O_3$ | 2.99 |
| CaO | 5.88 |
| MgO | 2.79 |
| $Na_2O$ | 16.11 |
| $K_2O$ | 0.69 |
| $B_2O_3$ | 5.31 |
| $F_2$ | 1.02 |

Schuller also indicates that the glass contains $Fe_2O_3$, $TiO_2$, $ZrO_2$, $Cr_2O_3$, SrO, BaO, MnO, ZnO, $Li_2O$, $SO_3$ and Pb in amounts less than 0.1%

The amorphous silica used as described above in Example 1 is commercially available. It has the following physical and chemical properties, from which it can be purchased.

| | |
|---|---|
| Specific gravity (g/cc) | 2.1 |
| Bulk Density | |
| Loose, unground | 22 pcf |
| Packed, unground | 34 pcf |
| Loose, micronized | 9 pcf |
| Packed, micronized | 14 pcf |
| Median agglomerate Size | |
| Low energy dispersion, unground | 35 $\mu$m |
| Ultrasonic dispersion, unground | 18 $\mu$m |
| Micronized | 1.2 $\mu$m |
| Ultimate Particle Size | 1 $\mu$m |
| Surface Area (BET, $N_2$) | 1.4 m²/g |
| $SiO_2$, anhydrous basis | 98+% |
| $SiO_2$, as shipped | 93% |
| F | 1.46% |
| $Al_2O_3$ | 0.13% |

$Na_2O$, $K_2O$, CaO, MgO, $TiO_2$, Pb, Hg and As are all less than 0.1 %.

The foregoing glass fibers undergo a reaction in the acidic furnishes described above. As a consequence of this reaction, there was sodium silicate on the surfaces of the fibers that were collected on the wire of the laboratory apparatus on which the composite sheets were formed. This sodium silicate acted as an inorganic binder, and assisted in retaining the silica powder from the second furnish in it composite sheet. This may be advantageous when it is desired to use a silica or other filler that has a sufficiently small particle size, relative to the minimum pore size of the first sheet, that the binder action of the sodium silicate is desirable to prevent the passage of some of the filler through the first sheet, and the sodium silicate does not interfere with the operation of the composite sheet, e.g., as a separator for a VRLA or other battery. However, the sodium silicate is not necessary, because the problem can be eliminated either by using fibers of slightly smaller diameter in the first furnish or by using a filler having a slightly larger particle size.

The procedure described in Example 1 has been repeated to produce other dual layered, filled, glass fiber separator hand sheets. Examples of furnishes which contained the previously identified amorphous silica and were used to produce such sheets are set forth in Table A, below, while examples of furnishes which contained an amorphous sodiumpotassium-aluminosilicate and were used to produce such sheets are set forth in Table C, below. Data about the properties of the other dual layer hand sheets, specifically dripping speed, sample weight, caliper (thickness in mm under a pressure of 10.34 KPa), tensile strength in the machine direction ("MD": parallel to the direction of the back and forth movement of the paddles in the tank), elongation (MD), percent, and pore size in $\mu$m are set forth in Tables A-1 and C-1, below. In addition, Table B gives the results of other testing of the separator material of Examples 4–7.

TABLE A

| Example | Solids in 1st layer | Solids in 2nd layer | Grammage, g/m² |
|---|---|---|---|
| 2 | 2.6 g (70%) of Schuller 206 and 1.1 g (30%) of Schuller 210X glass fibers | 10.4 g (70%) of previously described amorphous silica; 2.2 g (15%) each of Schuller 206 and 210X glass fibers | 200 target: 40 1st and 160 2nd layer |
| 3 | 3.2 g (70%) of Schuller 206 and 1.4 g (30%) of Schuller 210X glass fibers | 16.2 g (70%) of previously described amorphous silica, and 3.5 g (15%) each of Schuller 206 and 210X glass fibers | 300 target: 50 1st and 250 2nd layer |
| 4 | 2.6 g (70%) of Schuller 206 and 1.1 g (30%) of Schuller 210X glass fibers | 6.5 g (70%) of previously described amorphous silica, and 2.8 g (30%) of Schuller 206 glass fibers | 140 target: 40 1st and 100 2nd layer |
| 5 | 2.6 g (70%) of Schuller 206 and 1.1 g (30%) of Schuller 210X glass fibers | 13 g (70%) of previously described amorphous silica, and 5.6 g (30%) of Schuller 206 and 210X glass fibers | 240 target: 40 first and 200 2nd layer |
| 6 | 2.6 g (70%) of Schuller 206 and 1.1 g (30%) of Schuller 210X glass fibers | 19.5 g (70%) of previously described amorphous silica, and 8.4 g (30%) of Schuller 206 glass fibers | 300 target: 40 1st and 260 2nd layer |
| 7 | 2.6 g (70%) of Schuller 206 and 1.1 g (30%) of Schuller 210X glass fibers | 20.7 g (70%) of previously described amorphous silica, and 8.9 g (30%) of Schuller 206 glass fibers | 360 target: 40 1st and 320 2nd layer |

TABLE A-1

| Example | 60 minute dripping speed | Sample weight | Caliper (thickness, mm, under 10.34 KPa pressure) | Tensile strength (MD) KN/M | Percent Elongation, (MD) | Pore size, $\mu$m |
|---|---|---|---|---|---|---|
| 2 | 183 mm[1] | 7.29 g[1] | 0.92[1] | 0.48 | 2.52[1] | 15.0[1] |
| 3 | 178 mm | 8.07 g | 1.770 | 0.67 | 3.73 | 20.5 |
| 4 | 58 mm | 6.78 g | 0.855 | 0.26 | 3.03 | 16.4 |
| 5 | 68 mm | 6.34 g | 1.334 | 0.30 | 1.64 | 15.6 |
| 6 | 45 mm | 7.22 g | 1.575 | 0.38 | 1.88 | 12.9 |
| 7 | 32 mm | 8.80 g | 1.896 | 0.55 | 1.88 | 14.9 |

[1] mean of seven determinations.

TABLE B

| Example | | 4 | 5 | 6 | 7 |
|---|---|---|---|---|---|
| Target grammage (g/m²) | | 140 | 240 | 300 | 360 |
| Measured grammage (g/m²) | | 141.8 | 240.7 | 301.3 | 360.7 |
| Caliper (thickness, mm, under a pressure 10.34 KPa) | | 0.85 | 1.344 | 1.575 | 1.896 |
| Tensile, KN/M | MD | 0.27 | 0.30 | 0.38 | 0.55 |
| | CD | 0.25 | 0.29 | 0.33 | 0.50 |
| Elongation, percent | MD | 1.78 | 1.64 | 1.88 | 1.88 |
| | CD | 1.87 | 1.80 | 1.81 | 1.94 |
| Coulter, $\mu$m | Min | 3.401 | 2.889 | 2.633 | 2.505 |
| | Max | 16.37 | 15.55 | 12.93 | 14.45 |
| | Mean | 5.192 | 4.296 | 3.913 | 3.657 |
| Wicking, water, sec/10 mm | | 104 | 102 | 106 | 109 |
| Water absorbed, % | | 90.1 | 90.2 | 90.2 | 90.8 |

TABLE C

| Example | First Layer | Second Layer | Grammage, g/m² |
|---|---|---|---|
| 8 | 3.2 g (70%) of Schuller 206 and 1.4 g (30%) of Schuller 210X glass fibers | 16.2 g (70%) of subsequently described nepheline syenite, and 6.9 g (30%) of Schuller 206 glass fibers | 300 target: 50 first layer, and 250 second layer |
| 9 | 3.2 g (70%) of Schuller 206 and 1.4 g (30%) of Schuller 210X glass fibers | 16.2 g (70%) of subsequently described nepheline syenite, and 3.45 g (15%) each of Schuller 206 and 210X glass fibers | 300 target: 50 first layer, and 250 second layer |
| 10 | 3.2 g (70%) of Schuller 206 and 1.4 g (30%) of Schuller 210X glass fibers | 16.2 g (70%) of subsequently described nepheline syenite, and 6.9 g (30%) of Schuller 210X glass fibers | 300 target: 50 first layer, and 250 second layer |

TABLE C-1

| | Mean values | | | | | |
|---|---|---|---|---|---|---|
| Example | 60 minute dripping speed | Sample weight | Caliper (thickness in mm under 10.34 KPa pressure) | Tensile strength (MD) KN/m | Elongation (MD), percent | Pore size $\mu$m |
| 8 | 104 mm | 9.19 | 1.316 | 0.55 | 3.45 | 18.5 |
| 9 | 111 mm | — | 1.063 | 0.39 | 4.34 | 20.5 |
| 10 | — | — | 1.353 | 0.19 | 4.57 | 20.0 |

The nepheline syenite used as described above in Examples 8, 9 and 10 is a commercially available sodium potassium alumina silicate. It has a median particle size, as measured by a Sedigraph, of 2.4 $\mu$m, and a surface area as measured by the Fisher Sub-sieve method, of 1.7 m²/g; the following chemical analysis is typical:

| | |
|---|---|
| $SiO_2$ | 60.71% |
| $Al_2O_3$ | 22.92% |
| $Na_2O$ | 10.78 |
| $K_2O$ | 4.86 |

CaO, MgO, $TiO_2$, and $Fe_2O_3$ are all less than 0.1 %

It will be appreciated that other inert fillers than the silica and the sodiumpotassium-aluminosilicate powders whose use is described in the foregoing examples can be used in practicing the instant invention. In general, to be so used, the filler should be inert to battery reactions and materials present in a battery (see Kilroy patent discussed above), and should have a suitable particle size, preferably from 0.001 μm to 20 μm. Suitable inert fillers that have been recognized by the prior art include diatomaceous earth, silica, pulverized glass, kieselguhr, clay, wollastonite, pumice and other natural and synthetic silicates. The particles should be free of impurities such as iron, aluminum, zirconium and their oxides and other materials which are not inert to battery reactions or that will react with battery acids and reduce the capacity of the battery.

COMPARATIVE EXAMPLE

For purposes of comparison, but not in accordance with the instant invention, the apparatus described in Example 1 was used to produce a filled glass fiber separator hand sheet from a furnish comprised of acidified water, pH 2.5, and solids composed of 70 percent w/w amorphous silica (that used in Example 1) and 30 percent w/w Schuller 206 glass fibers. The furnish was poured into the apparatus and drained through the screen to produce a paper layer on the screen which would have had a grammage of about 250 g/m$^2$ if all of the solids in the slurry had been retained. The furnish was drained through the screen to produce a paper layer, and was heated in a drying oven to about 150° for 30 minutes. The hand sheet was found to have a grammage substantially less than 250 g/m$^2$ because a substantial portion of the amorphous silica drained through the screen.

Figure 4:
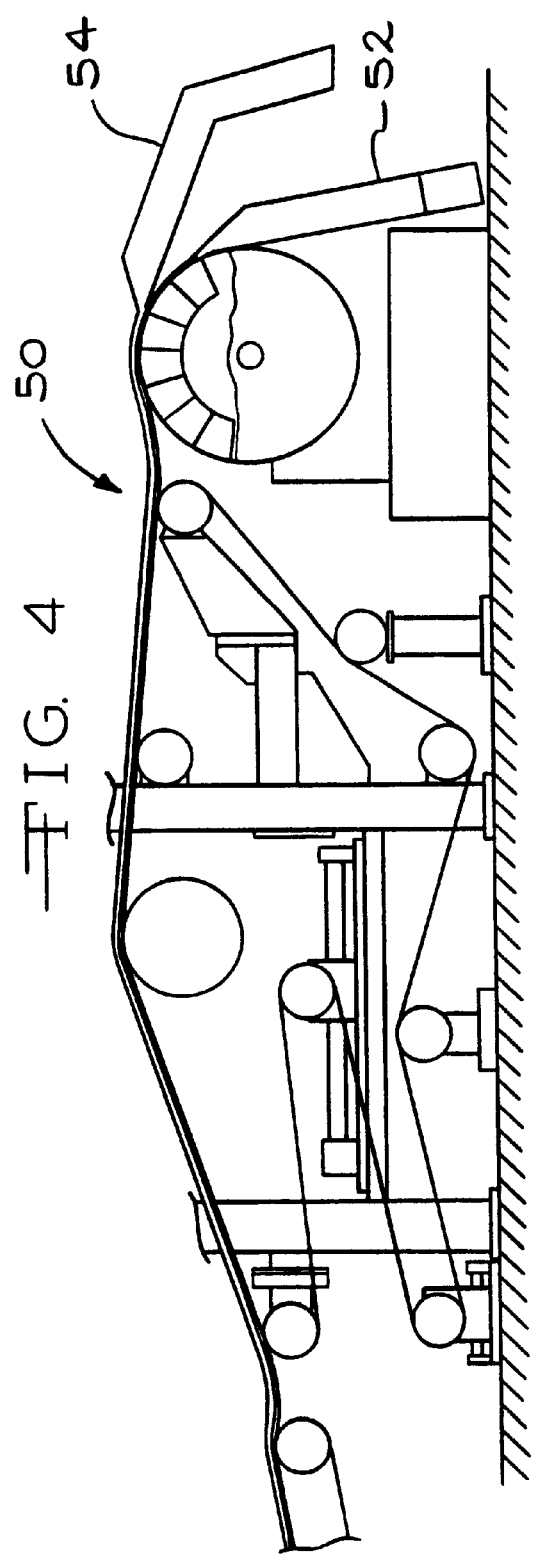
FIG. 4 is a schematic representation of a rotoformer paper making machine, including a second headbox for use in producing separator according to the present invention.

It will be appreciated that separator according to the present invention can be produced other than by the process described above. Referring to FIG. 4, a rotoformer paper making machine is indicated generally at 50 and comprises a first headbox 52 and a second headbox 54. Separator according to the present invention can be produced on such a rotoformer as well as other suitable paper making apparatus. Further, a third layer can be deposited from a third headbox on top of the first fiber layer and the second fiber and silica layer. Even an extremely thin third layer, e.g., one having a grammage less then 20 g/m$^2$, is advantageous because it minimizes the chance that silica deposited in the second layer will fall from the separator with handling.

Although the present invention has been described in terms of specific embodiments, it is anticipated that alterations and modifications thereof will be apparent to those skilled in the art. It is intended that the appended claims be interpreted as covering all such alterations and modifications as fall within the true spirit and scope of the invention.

I claim:

1. A sheet useful as a separator in a valve regulated lead acid battery, said sheet comprising at least a first layer of substantially binder free glass fibers and a second layer of substantially binder free glass fibers and a powder that is inert to battery reactions and to materials that are present in batteries, said sheet being produced by the method consisting of the steps of depositing a first, substantially binder free furnish consisting essentially of glass, fibers onto the wire of a paper making machine to form the first layer and depositing onto the fibers from the first furnish while they are on the wire of the paper making machine a second, substantially binder free furnish consisting essentially of glass fibers and a powder that is inert to battery reactions and to materials that are present in batteries to form the second layer, said powder having a mean particle size ranging from 0.001 μm to 20 μm, said powder having a particle size and density, and being present in said second layer in an amount such that a significant portion of the powder from a layer formed by depositing the second furnish onto the wire of the paper making machine would pass through the wire, and said first layer having a sufficiently small pore size that substantially all of the powder in said second furnish either remains in a layer formed by depositing, the second furnish on the first layer, while on the wire of the paper making machine, or is filtered from the liquid of said furnish by the fibers of the first layer while on the wire of the paper making machine, and substantially all of the powder in the second furnish is retained in the sheet.

2. A multi-layer sheet useful as a separator in a lead acid battery, said sheet comprising a first layer and a second layer, said first layer being substantially binder free, and consisting essentially of glass fibers, and said second layer being substantially binder free and consisting essentially of glass fibers and a powder that is inert to battery reactions and to materials that are present in batteries, said powder having a mean particle size ranging from 0.001 μm to 20 μm, said powder having a particle size and density, and being present in said second layer in an amount such that a significant portion of the powder from a layer formed by depositing the second furnish onto the wire of a paper making machine would pass through the wire, and said first layer having a sufficiently small pore size that substantially all of the powder in said second furnish either remains in a layer formed by depositing the second furnish on the first layer, while on the wire of the paper making machine, or is filtered from the liquid of said furnish by the fibers of the first layer while on the wire of the paper making machine, and substantially all of the powder in the second furnish is retained in the sheet.

3. A sheet as claimed in claim 1 wherein said first layer has a grammage less than 50 g/m$^2$.

4. A sheet as claimed in claim 1 which additionally includes a third layer, and wherein said third layer was formed by depositing a third, substantially binder free furnish consisting essentially of glass fibers onto said first furnish while on the wire of the paper making machine.

5. A VRLA battery comprising a case, having alternate negative and positive plates in said case, positive and negative terminals, suitable electrical connections among said plates, and said terminals, and separator material as claimed in claim 1 between alternate ones of said positive and negative plates.

6. A VRLA battery comprising a case, having alternate negative and positive plates in said case, positive and negative terminals, suitable electrical connections among said plates and said terminals, and separator material between alternate ones of said positive and negative plates that is a sheet as claimed in claim 3 and has a minimum nitrogen BET surface area of at least 1.1 m$^2$/g.

7. A sheet as claimed in claim 1 wherein said first layer has a minimum nitrogen BET surface area of at least 1.6 m$^2$/g.

8. A sheet as claimed in claim 1 wherein said second layer contains at least 50% of particulate silica powder.

9. A sheet as claimed in claim 1 wherein said second layer contains at least 70% of particulate silica powder.

10. A sheet as claimed in claim 1 wherein said first layer has a minimum nitrogen BET surface area of at least 1.0 m$^2$/g.

11. A sheet as claimed in claim 1 wherein at least one of said first and second layers contains both glass fibers and organic fibers.

12. A sheet as claimed in claim 11 wherein at least some of the organic fibers are bi-component fibers.

13. A sheet as claimed in claim 1 which additionally includes a third layer formed by depositing a third, substantially binder flee furnish consisting essentially of glass fibers onto the fibers from the second furnish while the fibers from the second furnish and the fibers from the first furnish are on the wire of the paper making machine.

14. A sheet as claimed in claim 13 wherein said third layer has a grammage less than 20 g/m².

15. A VRLA battery comprising a case, having alternate negative and positive plates in said case, positive and negative terminals, suitable electrical connections among said plates and said terminals, separator material as claimed in claim 1 between alternate ones of said positive and negative plates, and a gelled electrolyte distributed throughout said separator.

16. A method for producing a sheet useful as a separator in a valve regulated lead acid battery, said method consisting of the steps of depositing a first, substantially binder free furnish consisting essentially of glass fibers onto the wire of a paper making machine to form a first layer and depositing onto the fibers from the first furnish while they are on the wire of the paper making machine a second, substantially binder free furnish consisting essentially of glass fibers and a powder that is inert to battery reactions and to materials that are present in batteries, said powder having a mean particle size ranging from 0.001 $\mu$m to 20 $\mu$m to form a second layer, said powder having a particle size and density, and being present in said second layer in an amount such that a significant portion of the powder from a layer formed by depositing the second furnish onto the wire of the paper making machine would pass through the wire, and said first layer having a sufficiently small pore size that substantially all of the powder in said second furnish either remains in a layer formed by depositing the second furnish on the first layer, while on the wire of the paper making machine, or is filtered from the liquid of said furnish by the fibers of the first layer while on the wire of the paper making machine, and substantially all of the powder in the second furnish is retained in the sheet.

* * * * *